(12) United States Patent
Hu et al.

(10) Patent No.: US 10,563,495 B2
(45) Date of Patent: Feb. 18, 2020

(54) SEPARATION DEVICE

(71) Applicants: China Petroleum & Chemical Corporation, Beijing (CN); Sinopec Exploration & Production Research Institute, Beijing (CN)

(72) Inventors: Changchao Hu, Beijing (CN); Wei Dang, Beijing (CN); Xiaoxuan Xu, Beijing (CN); Zhiwei Tang, Beijing (CN); Lili Wang, Beijing (CN); Wenjie Tan, Beijing (CN); Pengyuan Ding, Beijing (CN); Caixia Bi, Beijing (CN); Youlin Zheng, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 1 day.

(21) Appl. No.: 15/998,404

(22) Filed: Aug. 15, 2018

(65) Prior Publication Data

US 2019/0055829 A1 Feb. 21, 2019

(30) Foreign Application Priority Data

Aug. 15, 2017 (CN) .......................... 2017 1 0698545

(51) Int. Cl.
*B01D 17/028* (2006.01)
*B01D 21/02* (2006.01)
(Continued)

(52) U.S. Cl.
CPC .......... *E21B 43/34* (2013.01); *B01D 17/0211* (2013.01); *B01D 17/0214* (2013.01); *B01D 21/0051* (2013.01); *B01D 21/0087* (2013.01)

(58) Field of Classification Search
CPC ............ B01D 17/0211; B01D 17/0214; B01D 21/0051; B01D 21/0087; C02F 1/40; E21B 43/34
(Continued)

(56) References Cited

U.S. PATENT DOCUMENTS 2,497,392 A * 2/1950 Breukel ............. B01D 17/0211
210/521
3,399,135 A * 8/1968 Rice .................... B01D 21/0051
210/521
(Continued)

FOREIGN PATENT DOCUMENTS

CN 101766921 A 7/2010
CN 103752042 A 4/2014

*Primary Examiner* — Christopher Upton
(74) *Attorney, Agent, or Firm* — Buchanan Ingersoll & Rooney PC

(57) ABSTRACT

Disclosed herewith a separation device for performing phase separation on a three-phase liquid. The device includes: a housing; at least one pair of longitudinal baffle plates; a flow channel formed between every pair of longitudinal baffle plates; and collection chambers formed between adjacent pairs of longitudinal baffle plates. Each collection chamber is provided with a transverse baffle plate to separate the collection chamber into a first phase and a second phase collection cells. Each flow channel is provided with multiple lateral baffle plates to separate the flow channel into multiple sub-channels. In the areas of each longitudinal baffle plate where the first phase and second phase collection cells are located respectively, said longitudinal baffle plate is provided with a first and a second phase guiding holes in communication with the first phase and the second collection cells respectively.

13 Claims, 2 Drawing Sheets

(51) Int. Cl.
  *E21B 43/34* (2006.01)
  *B01D 17/02* (2006.01)
  *B01D 21/00* (2006.01)

(58) Field of Classification Search
  USPC .................. 210/521, 522, 532.1, 540, 802; 166/75.12
  See application file for complete search history.

(56) References Cited

U.S. PATENT DOCUMENTS

| | | | | |
|---|---|---|---|---|
| 3,914,175 | A * | 10/1975 | Kunz | B01D 17/0211 |
| | | | | 210/802 |
| 6,547,005 | B2 * | 4/2003 | Haheim | E21B 43/38 |
| | | | | 210/521 |
| 8,080,157 | B2 * | 12/2011 | Fenton | E21B 43/385 |
| | | | | 210/522 |
| 9,981,206 | B2 * | 5/2018 | Dang | B01D 17/0214 |
| 2002/0153326 | A1 * | 10/2002 | Oddie | B01D 17/0214 |
| | | | | 210/521 |
| 2010/0018916 | A1 * | 1/2010 | Zhang | B01D 21/0051 |
| | | | | 210/521 |
| 2018/0207550 | A1 * | 7/2018 | Xiong | E21B 43/34 |
| 2018/0250611 | A1 * | 9/2018 | Xiong | B01D 21/0051 |

* cited by examiner

SEPARATION DEVICE

TECHNICAL FIELD

The present invention relates to a separation device, in particular to a device configured to separate various phases from a three-phase mixture. Particularly, the present invention relates to a device for separating oilfield produced liquid.

BACKGROUND ART

It is a commonly used technology in modern industries to separate various phases from a mixture containing multiple phases, and the technology has been widely used in multiple fields. For example, in municipal sewage treatment and industrial sewage treatment, the sewage containing oil and suspended solids needs to be separated, so as to perform classified treatment afterwards.

In addition, in the oil extraction industry, it is even an important technology to perform phase separation on the oilfield produced liquid. The oilfield produced liquid is complex in components, but it can usually be deemed as a three-phase mixture which mainly contains three phases, including water, oil and suspended solids.

Traditional dewatering device takes controlling moisture content in the oil as its main function, focusing on dewatering from the oilfield produced liquid, and therefore can be used to treat the oilfield produced liquid with high moisture content. However, the traditional dewatering device has the shortcomings of high energy consumption, low efficiency, high content of oil in the discharged water, and complex sewage post-treatment process.

In the prior arts, a built-in member is further used to improve the efficiency and effect in separating oil, water and solids. For example, CN101766921A and CN103752042A respectively disclose a device for separating oil, water and solids, wherein in both patents, a wing-shaped plate component is used as a built-in member. After settlement and delamination, the crude oil produced liquid with an extremely high content of moisture enters the wing-shaped plate component, wherein the separation of oil, water and solids is realized through density differences. However, the oil content in the discharged water from such device for separating oil, water and solids is still greater than 500 mg/L, and only about 80% mud is separated out from the produced liquid, thereby requiring a very complex sewage post-treatment system. Therefore, such device for separating oil, water and solids cannot satisfy the requirements of oilfield produced liquid containing a high content of moisture on efficient treatment of a large amount of liquid.

SUMMARY OF THE INVENTION

The present invention aims at providing a separation device with higher separation efficiency. In particular, the present invention aims at providing a device for performing phase separation on the oilfield produced liquid.

According to a first aspect of the present invention, a separation device is proposed, which is configured to perform phase separation on a liquid containing at least a first phase, a second phase, and a third phase. The separation device includes: a housing; at least one pair of longitudinal baffle plates which are arranged along a longitudinal direction of the housing; a flow channel formed between every pair of longitudinal baffle plates and used for flow of the fluid; and collection chambers formed between adjacent pairs of longitudinal baffle plates and/or formed between the longitudinal baffle plate and an inner wall of the housing. Each of the collection chambers is provided therein with at least one transverse baffle plate, which is configured to separate the collection chamber into a first phase collection cell and a second phase collection cell along the longitudinal direction. Each flow channel is provided therein with multiple lateral baffle plates, which are arranged in an inclined manner with respect to the longitudinal baffle plates, so as to separate the flow channel into multiple sub-channels arranged along an approximately vertical direction. In an area of each longitudinal baffle plate where the first phase collection cell is located, said longitudinal baffle plate is provided with a first phase guiding hole in communication with the first phase collection cell, while in an area of each longitudinal baffle plate where the second phase collection cell is located, said longitudinal baffle plate is provided with a second phase guiding hole in communication with the second phase collection cell.

According to the present invention, each fluid collection chamber is separated into a first phase collection cell and a second phase collection cell by the transverse baffle plate. In this way, when the to-be-separated fluid flows through the flow channel, the separation of the first phase and that of the second phase will be performed alternately in the direction of the flow channel. Accordingly, the first phase and second phase aggregated can be discharged in time via the first phase guiding hole and the second phase guiding hole respectively, thereby avoiding interphase interference. Therefore, the efficiency in separating oil, water and solids is significantly improved.

For the to-be-treated fluid, the densities of the first phase, the second phase and the third phase contained in the fluid differ from each other. Therefore, when the fluid flows through the flow channel, the three phases with different densities are respectively aggregated at a top part, a middle part and a bottom part of the flow channel. According to the present invention, on the one hand, since each flow channel is separated into multiple sub-channels, the area of shallow-depth sedimentation is increased. On the other hand, since multiple lateral baffle plates are arranged in each flow channel, the first phase in the fluid will be intercepted at a lower surface of the closest lateral baffle plate, thereby significantly improving the aggregation probability of the first phase. In addition, when the fluid flows through a flow channel, the first phase at the top part of the fluid can reach the top part of each sub-channel by migrating for a short distance only, and then be discharged to the first phase collection cell via the first phase guiding hole. Therefore, the migration distance of the first phase is significantly shortened. Similarly, when the fluid flows through the flow channel, the second phase at the bottom part of the fluid can reach the bottom part of each sub-channel by migrating for a short distance only, and then be discharged to the second phase collection cell via the second phase guiding hole. Therefore, the migration distance of the second phase is also significantly shortened. The third phase which is in the middle part of the fluid will flow through the flow channel directly. Therefore, the separation device according to the present invention can significantly improve the separation efficiency.

According to one preferred embodiment of the present invention, each sub-channel has a cross-sectional shape having a geometric highest point and a geometric lowest point.

According to one preferred embodiment of the present invention, the density of the third phase is greater than the density of the first phase, but smaller than the density of the second phase. The first phase guiding hole is arranged at a position corresponding to the geometric highest point, while the second phase guiding hole is arranged at a position corresponding to the geometric lowest point. Apparently, when the to-be-separated fluid flows through the flow channel, the first phase with the smallest density will be aggregated at the top part of each sub-channel, while the second phase with the largest density will be aggregated at the bottom part of each sub-channel. With such an arrangement, the first phase and the second phase can both be smoothly discharged into the first phase collection cell and the second phase collection cell, respectively.

According to one preferred embodiment of the present invention, the cross-sectional shape of the sub-channel is one of a triangle, a trapezoid, and a parallelogram.

According to one preferred embodiment of the present invention, the cross-sectional shape of the sub-channel is a triangle, and the lateral baffle plate and the longitudinal baffle plate together form an angle in a range of 10 to 80 degrees. The cross-sectional shape of a triangle is simple in structure and convenient to process, and can provide ideal separation efficiency.

According to one preferred embodiment of the present invention, in each sub-channel, the first phase guiding hole in the area corresponding to the first phase collection cell and the second phase guiding hole is arranged in the area corresponding to the second phase collection cell. In this way, since multiple first phase guiding holes and second phase guiding holes are alternately arranged in each sub-channel along the longitudinal direction, the separation efficiency is significantly improved.

According to one preferred embodiment of the present invention, multiple transverse baffle plates are arranged in each collection chamber along the longitudinal direction, so that multiple first phase collection cells and second phase collection cells which are arranged alternately are formed in the collection chamber. In this way, when the to-be-separated liquid flows through the flow channel, the separation of the first phase and the separation of the second phase will be performed repeatedly and alternately along the direction of the flow channel, thereby significantly improving the separation efficiency of the first phase and the second phase.

According to one preferred embodiment of the present invention, the transverse baffle plates in different collection chambers are aligned with each other in sequence in the transverse direction, thereby simplifying the structure and lowering the manufacturing cost.

According to one preferred embodiment of the present invention, all the first phase collection cells are connected with an external first phase collector via a first manifold, and all the second phase collection cells are connected with an external second phase collector via a second manifold.

According to one preferred embodiment of the present invention, the first phase guiding hole extends through a whole longitudinal length of the first phase collection cell, and the second phase guiding hole extends through a whole longitudinal length of the second phase collection cell.

According to one preferred embodiment of the present invention, an outlet of each flow channel is in communication with an external third phase collector.

According to one preferred embodiment of the present invention, the fluid is oilfield produced liquid, and the first phase, the second phase and the third phase are respectively oil, suspended solids, and water.

According to a second aspect of the present invention, a device for separating oilfield produced liquid is proposed.

The oilfield produced liquid contains an oil phase, a suspended solid phase, and an aqueous phase. The separation device includes: an approximately cylindrical housing; multiple pairs of longitudinal baffle plates) which are arranged along a longitudinal direction of the housing; a flow channel used for flow of the fluid and formed between every pair of longitudinal baffle plates; and collection chambers formed between adjacent pairs of longitudinal baffle plates and formed between the longitudinal baffle plate and an inner wall of the housing. Each collection chamber is provided therein with multiple transverse baffle plates spaced apart along the longitudinal direction, so as to separate the collection chamber into multiple oil phase collection cells and suspended solid phase collection cells that are arranged alternately along the longitudinal direction. Each flow channel is provided therein with multiple lateral baffle plates which are arranged in an inclined manner with respect to the longitudinal baffle plates, so as to separate the flow channel into multiple sub-channels which are arranged vertically, and each sub-channel has a cross-sectional shape of a triangle. In an area of each longitudinal baffle plate where the oil phase collection cell is located, an oil phase guiding hole in communication with the oil phase collection cell is arranged on the longitudinal baffle plate at a position corresponding to the geometric highest point of the triangle, and in an area of each longitudinal baffle plate where the suspended solid phase collection cell is located, a suspended solid phase guiding hole in communication with the suspended solid phase collection cell is arranged on the longitudinal baffle plate at a position corresponding to the geometric lowest point of the triangle.

BRIEF DESCRIPTION OF THE DRAWINGS

The above and other objects, characteristics and advantages of the present invention will become more apparent through a detailed description of the exemplary embodiments of the present invention in combination with the accompanying drawings. In the drawings.

Figure 1:
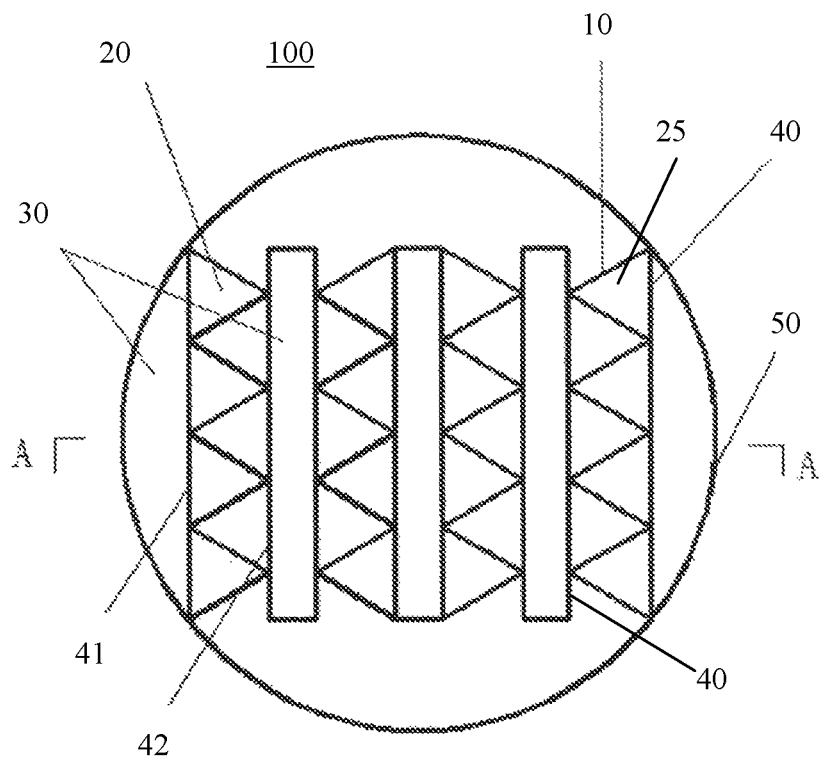
FIG. 1 is a cross-sectional view of a fluid phase separation device according to one embodiment of the present invention, and is also a cross-sectional view along line B-B of FIG. 2.

In the drawings, the same component is indicated by the same reference sign. The drawings are not drawn based on actual scales.

DETAILED DESCRIPTION OF THE EMBODIMENTS

The present invention will be further described below in combination with the accompanying drawings. To facilitate understanding, the principle of the present invention will be illustrated below in combination with a device for performing phase separation on the oilfield produced liquid (with major phases of oil, water, and suspended solids).

FIG. 1 is a cross-sectional view of a fluid phase separation device 100 according to one embodiment of the present invention, wherein the fluid phase separation device 100 is configured to separate the oilfield produced liquid which is fed into the fluid phase separation device, so as to output an aqueous phase, an oil phase and a suspended solid phase separately.

Figure 2:
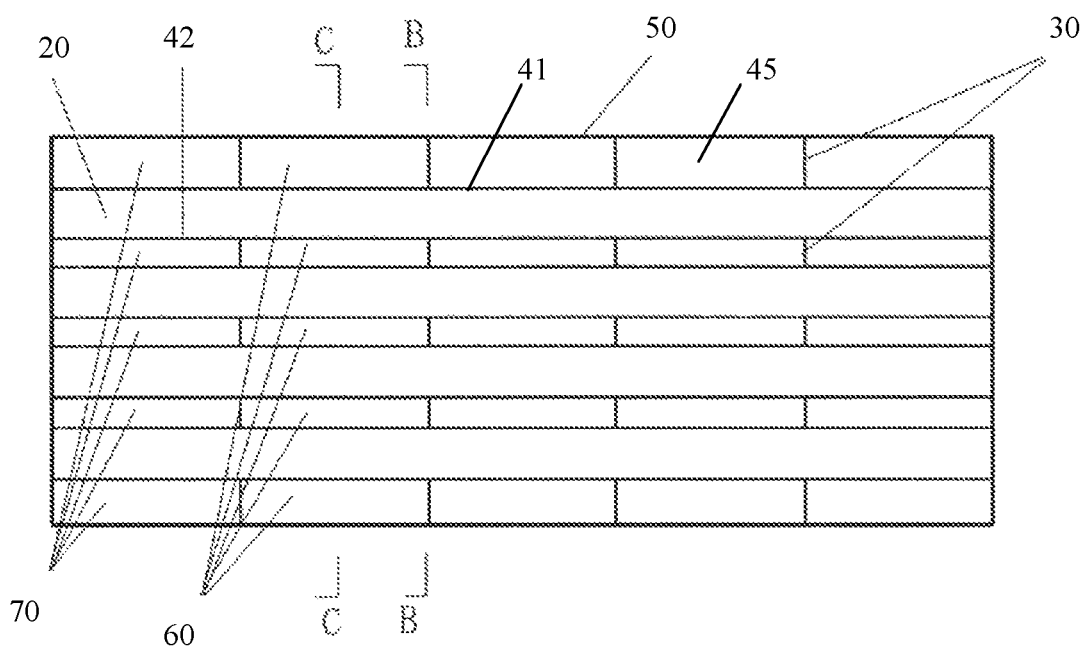
FIG. 2 is a cross-sectional view along line A-A of FIG. 1, showing an alternating arrangement of the first phase collection cell and the second phase collection cell of the fluid phase separation device as shown in FIG. 1 along the longitudinal direction.

As shown in FIG. 1, the fluid phase separation device 100 is configured to be a horizontal separator, including an approximately cylindrical housing 50. It should be noted that, in another embodiment not shown, the housing can also be formed into a quadrangle. As shown in FIG. 2, the housing 50 is provided therein with at least one pair of longitudinal baffle plates 40, which extends along a longitudinal direction (namely, the horizontal direction in FIG. 2) of the housing 50. This pair of longitudinal baffle plates 40 includes two longitudinal baffle plates which are in parallel with each other but are spaced apart in a transverse direction (namely, the horizontal direction in FIG. 1 and the vertical direction in FIG. 2), that is, a first longitudinal baffle plate 41 and a second longitudinal baffle plate 42. In the embodiment shown in FIG. 1 and FIG. 2, the fluid phase separation device 100 is provided with four pairs of longitudinal baffle plates 40, and thus contains in total four first longitudinal baffle plates 41 and four second longitudinal baffle plates 42. However, it should be understood that, the quantity of the longitudinal baffle plates 40 can be adjusted based on requirements of actual conditions.

A flow channel 20 is formed between the first longitudinal baffle plate 41 and the second longitudinal baffle plate 42 in each pair of longitudinal baffle plates 40. Therefore, in the device shown in FIG. 2, four flow channels 20 are formed in total. The fluid to be separated (i.e., oilfield produced liquid in the present embodiment) enters the flow channels 20 via an inlet (not shown) of the fluid phase separation device 100. The fluid is separated into an oil phase, an aqueous phase and a suspended solid phase after flowing through the flow channels 20, wherein the aqueous phase flows out from an outlet (not shown) of the fluid phase separation device 100, while the oil phase and the suspended solid phase flow out via respective pipelines, which will be elaborated in detail below. The inlet and the outlet of the fluid phase separation device 100 are respectively arranged at a first end (e.g., the left end in FIG. 2) and a second end (e.g., the right end in FIG. 2) of the housing 50.

In addition, a fluid collection chamber 45 is formed between the first longitudinal baffle plate 41 or the second longitudinal baffle plate 42 of each pair of longitudinal baffle plates 40 and the second longitudinal baffle plate 42 or the first longitudinal baffle plate 41 of an adjacent pair of longitudinal baffle plates 40. Meanwhile, a fluid collection chamber 45 is also formed between an inner wall of the housing 50 and the first longitudinal baffle plate 41 and the second longitudinal baffle plate 42 which are closest to the inner wall of the housing 50. Therefore, in the device shown in FIG. 2, five strip-shaped fluid collection chambers 45 are formed in total.

According to the present invention, at least one transverse baffle plate 30 is arranged in each fluid collection chamber 45, so as to separate the fluid collection chamber 45 into an oil phase collection cell 70 and a suspended solid phase collection cell 60. It should be noted that, the expression "transverse direction" means a direction which is approximately vertical to the longitudinal direction. In the context of the present invention, as long as a certain angle is formed between a baffle plate and the fluid collection chamber 45, the baffle plate can be understood as a "transverse" baffle plate. Preferably, each fluid collection chamber 45 is provided therein with multiple transverse baffle plates 30. These transverse baffle plates 30 extend respectively along the transverse direction, but are spaced apart from each other along the longitudinal direction. As shown in FIG. 2, each fluid collection chamber 45 is provided with four transverse baffle plates 30, so as to separate each fluid collection chamber 45 into five spaced collection cells, namely, three oil phase collection cells 70 and two suspended solid phase collection cells 60. As shown in FIG. 2, these three oil phase collection cells 70 and two suspended solid phase collection cells 60 are arranged alternately in the longitudinal direction. These oil phase collection cells 70 and suspended solid phase collection cells 60 can be in communication with their respective external collectors via corresponding manifolds.

As shown in FIG. 1, each flow channel 20 is provided therein with multiple lateral baffle plates 10, which are all inclined with respect to the longitudinal baffle plate 40, and are arranged in sequence along the vertical direction of the fluid phase separation device 100. In this way, two adjacent lateral baffle plates 10 and the first longitudinal baffle plate 41 and the second longitudinal baffle plate 42 which define the flow channel 20 together form a sub-channel 25. Therefore, each flow channel 20 is separated into multiple sub-channels 25 which are arranged along an approximately vertical direction. According to the present invention, the cross-section of each sub-channel 25 has a geometric highest point and a geometric lowest point. In the embodiment shown in FIG. 1, each sub-channel 25 has a triangular cross-sectional shape.

Figure 3:
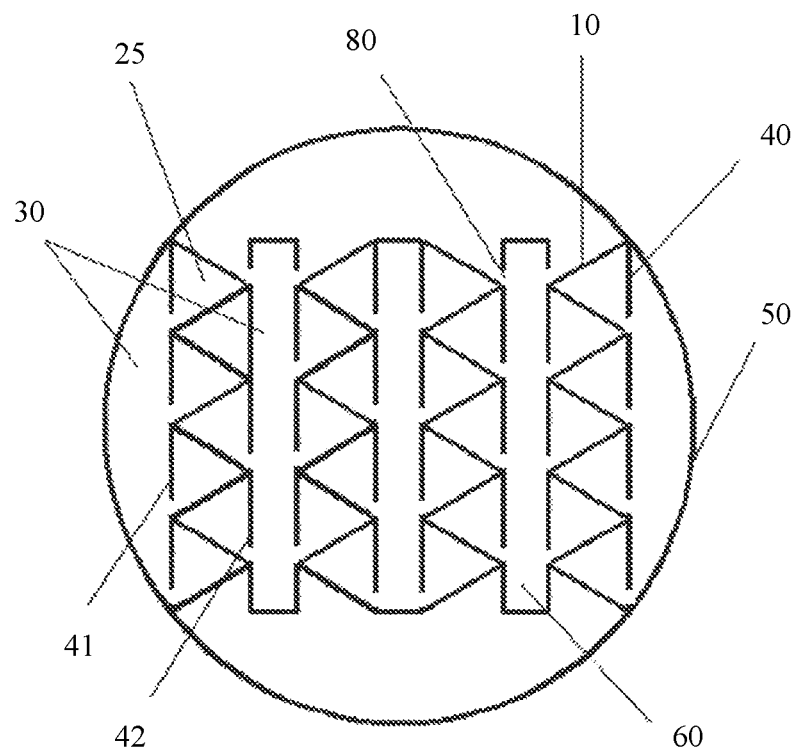
FIG. 3 is a cross-sectional view along line C-C of FIG. 2, showing the structure of the second phase collection cell of the fluid phase separation device according to the embodiment of the present invention.
Figure 4:
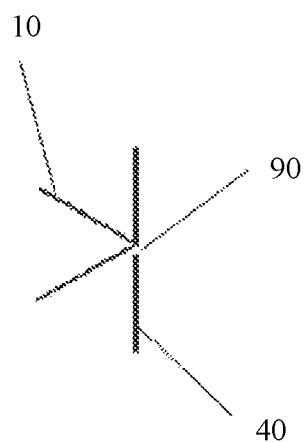
FIG. 4 shows a first phase guiding hole of the fluid phase separation device according to the embodiment of the present invention.
Figure 5:
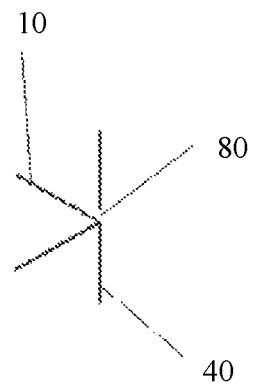
FIG. 5 shows a second phase guiding hole of a fluid phase separation device according to the embodiment of the present invention.

FIG. 3 is a cross-sectional view along line C-C in FIG. 2, showing the structure of a second phase collection cell 60 of the fluid phase separation device 100. As shown in FIG. 3, according to the present invention, in an area of each longitudinal baffle plate 40 where the suspended solid phase collection cell 60 is located, a suspended solid phase guiding hole 80 in communication with the suspended solid phase collection cell 60 is arranged on the longitudinal baffle plate 40 at a position corresponding to the geometric lowest point in the cross-section of each sub-channel 25 (i.e., the lowest point of the triangle). In addition, in an area of each longitudinal baffle plate 40 where the oil phase collection cell 70 is located, an oil phase guiding hole 90 in communication with the oil phase collection cell 70 is arranged on the longitudinal baffle plate 40 at a position corresponding to the geometric highest point in the cross section of each sub-channel 25 (i.e., the highest point of the triangle). FIG. 4 and FIG. 5 respectively show the details of the oil phase guiding hole 90 and the suspended solid phase guiding hole 80.

In this way, according to the present invention, after the oilfield produced liquid containing major phases of oil, water and suspended solids enters the fluid phase separation device 100, the oilfield produced liquid will flow through each flow channel 20, specifically, flow through each sub-channel 25 of each flow channel 20. When the oilfield produced liquid flows through the sub-channel 25, the oil phase in the produced liquid is aggregated at the top part of each sub-channel 25 due to a smaller density, while the suspended solid phase in the produced liquid is aggregated at the bottom part of each sub-channel 25 due to a larger density. In this way, the oil phase aggregated at the top part of the sub-channel 25 will enter the oil phase collection cell 70 via the oil phase guiding hole 90 arranged on the longitudinal baffle plate at the position corresponding to the geometric highest point of the sub-channel cross-section. Correspondingly, the suspended solid phase aggregated at the bottom part of the sub-channel 25 will enter the suspended solid phase collection cell 60 via the suspended solid phase guiding hole 80 arranged on the longitudinal baffle plate at a position corresponding to the geometric lowest point of the sub-channel cross-section. In addition, the aqueous phase in the produced liquid will flow continuously along the sub-channel 25, until the aqueous phase leaves the fluid phase separation device 100 via the outlet. Through this manner, the three phases in the oilfield produced liquid, namely, the oil, water and suspended solids, are effectively separated therefrom.

In the fluid phase separation device according to the embodiment of the present invention, the lateral baffle plate is arranged in an inclined manner with respect to the longitudinal baffle plate, such that the flow channel is divided into multiple sub-channels, each having a cross-sectional shape having a geometric highest point and a geometric lowest point. Meanwhile, an oil phase guiding hole in communication with the oil phase collection cell and a suspended solid phase guiding hole in communication with the suspended solid phase collection cell are respectively arranged on the longitudinal baffle plate at positions corresponding to the geometric highest point and the lowest point, respectively. Therefore, when the oilfield produced liquid flows through each sub-channel of the flow channel, the oil phase in the produced liquid will enter the oil phase collection cell via the oil phase guiding hole, the suspended solids will enter the suspended solid phase collection cell via the suspended solid phase guiding hole, and the aqueous phase will be discharged via the outlet after passing through the sub-channel.

According to the present invention, since each flow channel is separated into multiple sub-channels, the area of shallow-depth sedimentation is increased. In addition, since multiple lateral baffle plates are arranged in each flow channel, the oil phase in the fluid will be intercepted at a lower surface of the closest lateral baffle plate, thereby significantly improving the aggregation probability of the oil phase. In addition, when the produced liquid flows through one end, the oil phase at the top part can reach the top part of each sub-channel only by migrating for a short distance, thereby greatly shortening the migration distance of the oil phase. Similarly, when the produced liquid flows through one end, the suspended solid phase at the bottom part can reach the bottom part of each sub-channel only by migrating for a short distance, thereby greatly shortening the migration distance of the suspended solid phase. Therefore, the device according to the present invention has a favorable separation effect. Meanwhile, according to the present invention, water and solids, the processing capacity in unit volume is significantly improved, but still ensuring an efficient separation of oil.

According to the present invention, the cross-section of each sub-channel of the flow channel is configured to have a geometric highest point and a geometric lowest point. Such a cross-sectional shape can be, for example, a triangle, a trapezoid, or a parallelogram, etc. However, preferably, the cross-sectional shape of the sub-channel is a triangle, as shown in the figures.

According to the present invention, the lateral baffle plates 10 are arranged in an inclined manner with respect to the longitudinal baffle plates 40. Preferably, the angle formed by the lateral baffle plate 10 and the longitudinal baffle plate 40 is in a range of 10 to 80 degrees, and more preferably, 30 to 70 degrees.

According to the present invention, a flow channel 20 is formed between two longitudinal baffle plates 41 and 42 in each pair of longitudinal baffle plates 40, while a fluid collection chamber 45 is formed between each pair of longitudinal baffle plates 40 and an adjacent pair of longitudinal baffle plates 40. Each fluid collection chamber 45 is separated into an oil phase collection cell 70 and a suspended solid phase collection cell 60 which are arranged alternately by multiple transverse baffle plates 30. In this way, when the to-be-separated fluid, such as oilfield produced liquid, flows through the flow channel 20, the separation of the oil phase and the separation of the suspended solid phase will be performed repeatedly and alternately in the direction of the flow channel 20. In the embodiment shown in FIG. 2, the oilfield produced liquid will be subjected to oil phase separation for three times and suspended solid phase separation for twice alternately in the direction of the flow channel 20. In this way, the aggregated oil phase and suspended solid phase can be discharged in time via the oil phase guiding hole and the suspended solid phase guiding hole respectively, thereby avoiding interphase interference. Meanwhile, the separation efficiency of the oil phase and the separation efficiency of the suspended solid phase are both significantly improved.

According to one preferred embodiment of the present invention, the oil phase collection cells 70 separately arranged in different fluid collection chambers 45 are aligned with each other along the transverse direction (namely, the vertical direction in FIG. 2), while the suspended solid phase collection cells 60 separately arranged in different fluid collection chambers 45 are aligned with each other along the transverse direction. Such a setting can simplify the structure and lower the manufacturing cost.

For each collection chamber 45, the size of the oil phase collection cell 70 and the size of the suspended solid phase collection cell 60 can be set to be the same or different. In actual applications, the size of the oil phase collection cell 70 and the size of the suspended solid phase collection cell 60 can be adjusted based on the properties of the oil phase and the suspended solid phase in the oilfield produced liquid. For example, when the oilfield produced liquid contains more oil but less suspended solids, the oil phase collection cell 70 can be set to be relatively long while the suspended solid phase collection cell 60 can be set to be relatively short.

According to one preferred embodiment of the present invention, each oil phase collection cell 70 is communication with an external oil phase collector (not shown) via an oil phase manifold, while each suspended solid phase collection cell 60 is communication with an external suspended solid phase collector (not shown) via a suspended solid phase manifold. Through such a setting, the separated oil phase and the suspended solid phase can be collected conveniently.

The effect of the fluid phase separation device according to the present invention will be illustrated below through two examples.

Example 1

The fluid phase separation device 100 as shown in FIG. 1 to FIG. 5 is utilized to perform phase separation on heavy oil produced liquid. The heavy oil produced liquid has a moisture content of 85%, with a crude oil density of 0.95 g/cm.

In the fluid phase separation device 100, a lateral baffle plate 10 is 2 m in length and 50 mm in width. The angle formed between the lateral baffle plate 10 and the longitudinal baffle plate 40 is 60 degrees. The collection chamber 45 is 50 mm in width. The diameter of the oil phase guiding hole 80 is 3 mm, and the diameter of the suspended solid phase guiding hole 90 is 20 mm.

Experiments show that, when the fluid phase separation device 100 is utilized to treat the above heavy oil produced liquid, the oil phase fluid as separated has a moisture content of 21%, and the aqueous phase fluid as separated has an average oil content of 22 mg/L and an average suspended solid content of 14 mg/L. The water quality of the aqueous phase can satisfy the water quality requirements of inflow water of a filter.

Example 2

The fluid phase separation device 100 as shown in FIG. 1 to FIG. 5 is utilized to perform phase separations on heavy oil produced liquid. The heavy oil produced liquid has a moisture content of 85%, with a crude oil density of 0.95 g/cm$^3$.

In the fluid phase separation device 100, a lateral baffle plate 10 is 3 m in length and 81 mm in width. The angle formed between the lateral baffle plate 10 and the longitudinal baffle plate 40 is 67.5 degrees. The collection chamber 45 is 80 mm in width. The diameter of the oil phase guiding hole 80 is 4 mm, and the diameter of the suspended solid phase guiding hole 90 is 30 mm.

Experiments show that, when the fluid phase separation device 100 is utilized to treat the above heavy oil produced liquid, the oil phase fluid as separated has a moisture content of 28%, the aqueous phase fluid as separated has an average oil content of 28 mg/L and an average suspended solid content of 13 mg/L. The water quality of the aqueous phase can satisfy the water quality requirements of inflow water of a filter.

Although the principle of the present invention is illustrated above in combination with the device for performing phase separation on the oilfield produced liquid, it can be understood that, the principle of the present invention can also be applied to the treatment of municipal sewage and industrial sewage. In addition, although in the embodiments described above the device is configured to separate the fluid which contains three phases with different densities, it can be understood that, as long as the phases contained in the fluid can be approximately classified into the three phases with different densities, the present invention can also be applied to the separation of such type of fluid which contains more phases.

Although the present invention has been described in detail with reference to preferred embodiments, under the premise of not departing from the scope of the present invention, various improvements can be made to the present invention, and equivalents can be used to replace parts in the present invention. In particular, as long as no structural conflict exists, various technical features mentioned in each embodiment can be combined in any arbitrary manner. The present invention is not limited to the specific embodiments disclosed herein, but contains all the technical solutions falling within the scope of the claims.

The invention claimed is:

1. A separation device configured to perform phase separation on a liquid containing at least a first phase, a second phase, and a third phase, including:
   a housing;
   at least one pair of longitudinal baffle plates which are arranged along a longitudinal direction of the housing;
   a flow channel formed between every pair of longitudinal baffle plates and used for flow of the fluid; and
   collection chambers formed between adjacent pairs of longitudinal baffle plates and/or formed between the longitudinal baffle plate and an inner wall of the housing, each of the collection chambers being provided therein with at least one transverse baffle plate, which is configured to separate the collection chamber into a first phase collection cell and a second phase collection cell along the longitudinal direction,
   wherein each flow channel is provided therein with multiple lateral baffle plates, which are arranged in an inclined manner with respect to the longitudinal baffle plates, so as to separate the flow channel into multiple sub-channels arranged along an approximately vertical direction, and
   in an area of each longitudinal baffle plate where the first phase collection cell is located, said longitudinal baffle plate is provided with a first phase guiding hole in communication with the first phase collection cell, while in an area of each longitudinal baffle plate where the second phase collection cell is located, said longitudinal baffle plate is provided with a second phase guiding hole in communication with the second phase collection cell.

2. The separation device according to claim 1, wherein each sub-channel has a cross-sectional shape having a geometric highest point and a geometric lowest point.

3. The separation device according to claim 2, wherein a density of the third phase is greater than that of the first phase, but smaller than that of the second phase, and
   the first phase guiding hole is arranged at a position corresponding to the geometric highest point, while the second phase guiding hole is arranged at a position corresponding to the geometric lowest point.

4. The separation device according to claim 3, wherein the cross-sectional shape of the sub-channel is one of a triangle, a trapezoid, and a parallelogram.

5. The separation device according to claim 4, wherein the cross-sectional shape of the sub-channel is a triangle, and the lateral baffle plate and the longitudinal baffle plate together form an angle in a range of 10 to 80 degrees.

6. The separation device according to claim 1, wherein in each sub-channel, the first phase guiding hole in the area corresponding to the first phase collection cell and the second phase guiding hole is arranged in the area corresponding to the second phase collection cell.

7. The separation device according to claim 1, wherein multiple transverse baffle plates are arranged in each collection chamber along the longitudinal direction, so that multiple first phase collection cells and second phase collection cells which are arranged alternately are formed in the collection chamber.

8. The separation device according to claim 7, wherein the transverse baffle plates in different collection chambers are aligned with each other in sequence in a transverse direction.

9. The separation device according to claim 7, wherein all the first phase collection cells are connected with an external first phase collector via a first manifold, and all the second phase collection cells are connected with an external second phase collector via a second manifold.

10. The separation device according to claim 1, wherein the first phase guiding hole extends through a whole longitudinal length of the first phase collection cell, and the second phase guiding hole extends through a whole longitudinal length of the second phase collection cell.

11. The separation device according to claim 1, wherein an outlet of each flow channel is in communication with an external third phase collector.

12. The separation device according to claim 1, wherein the fluid is oilfield produced liquid, and the first phase, the second phase and the third phase are respectively oil, suspended solids, and water.

13. A device for separating oilfield produced liquid, which contains an oil phase, a suspended solid phase, and an aqueous phase, including:
  an approximately cylindrical housing;
  multiple pairs of longitudinal baffle plates which are arranged along a longitudinal direction of the housing;
  a flow channel used for flow of the fluid and formed between every pair of longitudinal baffle plates; and
  collection chambers formed between adjacent pairs of longitudinal baffle plates and formed between the longitudinal baffle plate and an inner wall of the housing, each collection chamber being provided therein with multiple transverse baffle plates spaced apart along the longitudinal direction, so as to separate the collection chamber into multiple oil phase collection cells and suspended solid phase collection cells that are arranged alternately along the longitudinal direction,
  wherein each flow channel is provided therein with multiple lateral baffle plates which are arranged in an inclined manner with respect to the longitudinal baffle plates, so as to separate the flow channel into multiple sub-channels which are arranged vertically, each sub-channel having a cross-sectional shape of a triangle, and
  in an area of each longitudinal baffle plate where the oil phase collection cell is located, an oil phase guiding hole in communication with the oil phase collection cell is arranged on the longitudinal baffle plate at a position corresponding to the geometric highest point of the triangle, and in an area of each longitudinal baffle plate where the suspended solid phase collection cell is located, a suspended solid phase guiding hole in communication with the suspended solid phase collection cell is arranged on the longitudinal baffle plate at a position corresponding to the geometric lowest point of the triangle.

* * * * *